United States Patent
Nurnberger et al.

(10) Patent No.: US 6,827,090 B2
(45) Date of Patent: Dec. 7, 2004

(54) PROCESS FOR REMOVING DEPOSITS FROM WATER-CARRYING SYSTEMS AND DEVICES FOR WATER SUPPLY

(75) Inventors: Michael Nurnberger, Regenstauf (DE); Robert Nusko, Wiesent (DE); Georg Maier, Regensburg (DE)

(73) Assignee: R. Späne KG, Rheinfelden (DE)

( * ) Notice: Subject to any disclaimer, the term of this patent is extended or adjusted under 35 U.S.C. 154(b) by 32 days.

(21) Appl. No.: 09/923,051

(22) Filed: Aug. 6, 2001

(65) Prior Publication Data

US 2003/0205536 A1 Nov. 6, 2003

Related U.S. Application Data

(63) Continuation of application No. PCT/DE00/04426, filed on Dec. 11, 2000.

(51) Int. Cl.[7] .............................. B08B 3/00; B08B 9/00; B08B 9/027

(52) U.S. Cl. .............................. 134/22.1; 134/2; 134/3; 134/22.11; 134/22.13; 134/22.14; 134/22.16; 134/22.19; 134/26; 134/28; 134/34; 134/36; 134/41; 510/247; 510/254; 510/477; 510/488; 510/499; 510/492; 510/505; 510/570

(58) Field of Search .............................. 134/2, 3, 22.1, 134/22.11, 22.13, 22.14, 22.16, 22.19, 26, 28, 34, 36, 41, 42; 510/247, 254, 477, 488, 499, 492, 505, 570

(56) References Cited

U.S. PATENT DOCUMENTS

| | | | | |
|---|---|---|---|---|
| 2,335,689 A | * | 11/1943 | Morgan et al. | 507/264 |
| 3,072,502 A | * | 1/1963 | Alfano | 134/3 |
| 3,428,488 A | * | 2/1969 | Dillen et al. | 134/3 |
| 3,510,351 A | * | 5/1970 | Dillen et al. | 134/22.11 |
| 3,723,333 A | * | 3/1973 | Freyhold et al. | 252/175 |
| 4,347,899 A | * | 9/1982 | Weeter | 166/310 |
| 4,789,406 A | * | 12/1988 | Holder et al. | 134/3 |
| 4,810,405 A | | 3/1989 | Waller et al. | 252/81 |
| 5,024,783 A | * | 6/1991 | Busch et al. | 510/247 |
| 5,078,894 A | | 1/1992 | Horwitz et al. | 252/81 |
| 5,122,279 A | | 6/1992 | Guess | 210/717 |
| 5,587,142 A | | 12/1996 | Horwitz et al. | 423/658.5 |
| 5,910,475 A | | 6/1999 | Neumiller et al. | 510/238 |
| 6,504,077 B1 | * | 1/2003 | Purohit et al. | 588/18 |

FOREIGN PATENT DOCUMENTS

| | | |
|---|---|---|
| DE | 2 040 546 | 6/1972 |
| DE | 25 20 988 A | 11/1975 |
| DE | 33 03 802 A1 | 8/1984 |
| DE | 198 08 621 A1 | 9/1999 |
| EP | 0 113 060 B1 | 10/1986 |

* cited by examiner

*Primary Examiner*—Zeinab El-Arini
(74) *Attorney, Agent, or Firm*—Henry M. Feiereisen; Ursula B. Day

(57) ABSTRACT

Process for removing deposits from water-carrying systems and devices for water supply, or from their individual parts, in which the deposits are dissolved by means of an aqueous treatment solution and removed in dissolved form from the system or the device or their individual parts, wherein the deposits are dissolved by means of an aqueous treatment solution comprised of a combination of (i) a reducing agent, in particular in the form of a slat-like, reducing sulfur-oxygen compound, nitrogen-oxygen compound or phosphorous-oxygen compound, and (ii) a complexing agent having phosphonic acid groups or phosphonate groups or a complexing agent of the hydroxy acid type at pH values in the range of approximately 4.5 to 9.5, in particular from approximately 6.0 to 8.0.

13 Claims, No Drawings

PROCESS FOR REMOVING DEPOSITS FROM WATER-CARRYING SYSTEMS AND DEVICES FOR WATER SUPPLY

CROSS-REFERENCES TO RELATED APPLICATIONS

This application is a continuation of prior filed copending PCT International application no. PCT/DE00/04426, filed Dec. 11, 2000.

This application claims the priority of German Patent Applications, Serial No. 199 59 592.5, filed Dec. 10, 1999, and 100 04 581.2, filed Feb. 2, 2000, the subject matter of which is incorporated herein by reference.

BACKGROUND OF THE INVENTION

The present invention relates to a process for removing deposits from water-carrying systems and devices for water supply.

The invention is not concerned with prevention of deposit formation, but with the dissolution of already formed deposits.

Water-carrying systems and devices for water supply are mainly systems and devices, which are fed with cold fresh water, preferably originating from natural sources, e.g. wells, or standing or flowing bodies of water. The devices for water supply may, e.g., serve the communal drinking water supply, but may also include devices for producing and supply and drainage of process water for industrial purposes, e.g., to cooling systems and heat exchangers for applications in the chemical industry, food industry, brewing industry or power engineering.

Depending on the source of the fresh water and its mineral contents, deposits, called ochering and sintering, precipitate from the fresh water under participation of microorganism in the water and, e.g., must be removed periodically from respective devices, e.g. drinking water reservoirs, water conduits, filters and wells or from plants for water preparation and individual plant sections, e.g. an oxidation device or a separation reactor, as well as from plant part(s) used therein, in order to ensure their productivity as well as the desired water quality. The deposits, which the present application is primarily concerned with, belong hereby to the ocherings and contain as main components iron compounds and/or manganese compounds of oxidic nature. A particular important field of application of the invention is the well regeneration.

Wells are subject to various aging effects, i.a. because of the formation of the stated deposits, during extraction of water from wells during the service life. As a result, the extractable amount of water decreases. Deposits of the type of the ocherings relate to deposits based on iron compounds and manganese compounds in the areas of the gravel heap, filtering tube slots and in the porous aquifer surrounding the well. Ocher deposits upon the well narrow the porous space necessary for water passage. As a consequence of the mainly solid nature of the well ocher and its distribution to inaccessible materials, the use of chemical agents ("regenerative solutions") must almost always follow a mechanic-hydraulic preliminary cleansing. The mechanic-hydraulic preliminary treatment and the assistance of the subsequent chemical treatment are carried out in practice by apparatuses such as high-pressure purifiers and gravel washers, which support the separation processes and the distribution and circulation of the regenerating solutions in the gravel. Currently, the ocher is dissolved almost exclusively by regenerative solutions containing inorganic acids. However, organic acids have been used on occasions as well, e.g. according to German Pat. No. DE 2 040 546 with ascorbic acid. Organic acids, however, do not have the solubilization capability as highly concentrated mineral acids and have the further drawback of representing nutrients for microorganism to therefore promote a renewed infection of purified devices. However, they are normally compatible with metallic and wooden materials which form the basis for manufacturing the devices and their components.

A process, which was standard practice for the last years when it came to cleaning drinking water reservoirs and well regeneration, is the process according to European Pat. No. EP 0 113 060 B2, which utilizes a treatment solution containing hydrochloric acid as well as hydroxide peroxide. The process has the advantage that the manganese deposits, which normally are very difficult to dissolve, can be quickly and effectively dissolved and that an already sterilized device is obtained, once the deposits are dissolved and removed.

Pyrotechnical processes, as the process shown, e.g., in German Pat. No. DE 198 08 621 A1, pursue a completely different path in well renewal; however, the universal use of such processes is questionable.

When handled improperly, the use of concentrated mineral acids for de-ochering of wells sometimes includes significant risks during transport and during use. Apart from the corrosive and severely etching effects of an acid, such as concentrated hydrochloric acid, their vapor, too, may cause massive irritations of the respiratory system. Furthermore, the use of hydrochloric acid is limited to such wells, which are made of construction materials that can withstand extremely low pH values below 1.0.

Hydrogen peroxide has to be transported and employed substantially as careful as hydrochloric acid. In the event, contaminations migrate into a reservoir with hydrogen peroxide, a catalytic decomposition of the peroxide may be triggered with a strong gas development. Also, peroxide mixed with hydrochloric acid develops eventually gas so that there is a not insignificant danger when incorrectly used (premature mixing of hydrochloric acid and hydrogen peroxide).

The use of organic acids for de-ochering of wells, is, as already stated, not optimal as a consequence of the limited effect of these substances. A further drawback thereof is the possibility of metabolism of many organic acids by microorganisms, so that the introduction of organic acids may promote an infection of the well.

It would therefore be desirable and advantageous to provide an improved process for removing deposits from water-carrying systems and devices for water supply, which obviates prior art shortcomings and which uses agents having neutral pH values to allow handling without great risk potential during transport and use, and enabling an effective removal of deposits and de-ochering, regardless of the construction material for wells and the ocher composition.

SUMMARY OF THE INVENTION

According to one aspect of the present invention, a process for removing deposits from water-carrying systems and devices for water supply, or from their individual parts, includes the step of dissolving a deposit from a water-carrying system or a device for water supply or from individual parts of the device by means of an aqueous treatment solution comprised of a combination of a reducing agent and a complexing agent, wherein the complexing agent is selected from the group consisting of phosphonic acid group, phosphonate group, and a complexing agent of hydroxy acid type.

Another aspect of the present invention relates to the use of particular, complexing agents, known per se, with phosphonic acid groups or phosphonate groups or dithionite and/or disulfite as complexing or reducing components of treatment solutions for dissolution of deposits, as required for the process according to the present invention.

Dithionite and disulfite (pyrosulfite) in neutral aqueous solution have a great solubilization capability with respect to well ocher. Primarily Mn(IV)-containing ocher are dissolved as Mn(IV) is reduced to Mn(II). Primarily Fe(III)-containing ocher are dissolved as Fe(III) is reduced to Fe(II) and/or transformed into colorless crusts which can be blown off more easily than the original deposits of well ocher. Dithionite solutions and pyrosulfite solutions or mixtures of these solutions are thus essentially as effective as mixtures of hydrochloric acid and hydrogen peroxide. As a consequence of the pH neutral application and its reducing character, the agents according to the invention can be utilized without limitation also in the presence of metals. Corroded metal parts, like e.g. conduits, are simultaneously freed from rust in a gentle manner by the agents according to the invention, thereby significantly extending their service life and their function. Risks during transport and use are significantly lessened compared to the use of hydrochloric acid and/or hydrogen peroxide. The sulfate, ultimately obtained during the reaction with the ocher is toxicologically and ecologically of no problem. Dithionite and pyrosulfite, as technical chemicals, are inexpensive to acquire, in particular as sodium dithionite or as sodium metabisulfite (sodium pyrosulfite), and thus their application is economical. Dithionite/pyrosulfite and their reactive products are removed through precipitation—optionally after oxidation—from regenerating solutions and flushing solutions. A further advantage of using dithionite and/or pyrosulfite is their sterilizing effect.

As possible substitutes for the reducing sulfur-oxygen compounds dithionite and disulfite, when the process according to the invention is carried out, also salts of reducing acidic nitrogen-oxygen compounds, e.g. nitrite or reducing acidic phosphorus-oxygen compounds, e.g. phosphites or hypophosphites, are further to be mentioned, so long as such compounds can be used in the case at hand under observation of water regulations.

It has been further shown that the effect of the reducing agents, i.e. in particular of dithionite/disulfite, can be improved in respect to a removal of the well ocher deposits, when the treatment solution further contains a complexing agent which contains phosphonic acid groups, optionally in salt form, or is of the hydroxy(poly) carboxylic acid type, e.g. citrate. The presence of the complexing agent prevents the formation of crusts that are too thick, when the well ocher reacts with the reducing agent. It has been shown hereby, that the complexing agent significantly improves the separation process of the components of the well ocher from the filter slots and the gravel bed. Therefore, a combination of reducing agent and complexing agent is preferably used.

The complexing agents of the phosphonic acid type, which are known per se, have the advantage of being not only toxically safe, when used for well regeneration, but also unusable for the metabolism of the microorganisms present in cold water. Even when traces of treatment solution should remain in the well, purified wells thus do not show any noticeable tendency for renewed infection, which can be observed not infrequently when residues of other constituents of a treatment solution, e.g. microbiologically useable organic acids like ascorbic acid or citric acid, remain in the well.

In order to keep the pH value of the treatment solution in the desired range of about 4.5 to 9.5, in particular from about 6.0 to 8.0, buffers are normally further added to the treatment solution, in particular buffers on the basis of safe salts of weak mineral acids. Suitable buffer systems for adjusting a desired pH value can be retrieved from relevant chemical reference books. Particular suitable for the adjustment of a pH value of about 6.4 is the system hydrogen carbonate/carbonic acid. Other buffer systems may, however, also be used.

It has been further shown that a regeneration of a well according to the process of the invention is followed by a fairly rapid production decrease of the well as a consequence of a quick renewed formation of deposits. As reason, it has been determined that evidently during pumping out of the deposit-laden solutions relevant amounts of dissolved iron compounds and/or manganese compounds and/or darkly colored iron deposits remain in the gravel bed. These deposits are presumably Fe(II)/Fe(III) mixtures which can easily be oxidized, resulting in renewed formation of voluminous precipitations of presumably iron(III) oxides/iron (III) oxide hydrates/iron(III) hydroxides, which block the gravel bed and relatively quickly negate the regeneration success.

This undesired phenomena can be counteracted according to a preferred embodiment of the process of the invention for well regeneration by aftertreating the well, after pumping out the spent treatment solution which contains the components of the dissolved deposits, through addition of a suitable oxidant. As a result, the residues of dissolved iron compounds and/or manganese compounds in the gravel bed are completely precipitated in the form of compact thin deposits and are no longer available for the formation of voluminous, clogging precipitations. Hydrogen peroxide is preferred as oxidant as it exhibits a high and rapid efficacy and is safe and, moreover, has a sterilizing effect, thereby ensuring a lasting sterilization of the regenerated well.

When carrying out the process according to the invention with dithionite for removing deposits from the walls of drained drinking water reservoirs, gaseous $SO_2$ may be released, which has an obnoxious, penetrating odor. In these cases, it is proposed to add $SO_2$-binding components to the treatment solution. Such application also allows a preparation of a treatment solution with viscosity-enhancing additives for retarding the drainage of the treatment solution from the wall being treated and impede the release of $SO_2$, so that it is possible to work with $SO_2$-binding solutions or oxidizing solutions during flushing of the walls to thereby greatly diminish the release of $SO_2$.

The chemical components required for carrying out the process according to the invention may be disseminated in any suitable form, i.e. as separate or pre-mixed solids, as solutions and concentrates or as pastes or gels. Preparation of the treatment solution may be implemented before contacting the deposits to be treated; however, it is also possible to prepare the treatment solution is situ in the devices being treated, e.g. in a well or a pipeline, by adding the individual constituents at different times.

When the deposits should be removed from such individual parts, e.g. individual parts of a water preparation plant, which are detached from the plant or device, the process according to the invention may also be carried out in such a manner that the parts being dismantled and to be freed from deposits are placed in a bath of a treatment solution according to the invention.

Examples, which describe the efficacies of the process according to the invention with reference to an exemplified well ocher, will now be described in more detail.

EXAMPLE 1

Used Substances or Agents:

Used is a well filter gravel enveloped by a well ocher which forms a solid layer of mean width of approximately 2 mm about the gravel particles (present in a particle size fraction of 0.2 to 0.5 mm). The well ocher is composed in this example chemically primarily of Fe(III) compounds that are difficult to dissolve. The ocher-enveloped gravel particles have been pre-dried at 60° C. for constant weight.

Removal of the well ocher from the gravel particles is carried out by using a freshly prepared 10% solution of solid sodium dithionite in water (e.g. 100 g sodium dithionite per 1 kg solution).

Testing Method:

5.00 g of the dried gravel particles, enveloped by well ocher, are added in 5 ml freshly prepared 10% solution of sodium dithionite. The sample (pH value$_{(beginning)}$ approximately 7) is then left standing for 16 hours, without mechanical influence (agitating, ultrasound or the like) at 20° C.

After 16 hours, the sample is slightly shaken for peeling off loosely adhering well ocher, and the remaining ocher sample (gravel particles with enveloping well ocher) is separated from the liquid phase (remaining solution of sodium dithionite with blown off ocher particles).

The remaining, ocher-enveloped gravel particles are dried to constant weight and weighed again.

Result:

3.30 g ocher-enveloped gravel particles remain. This corresponds to a decrease of 34%, relating to the initially used filter gravel quantity. A significant, gravimetrically not registered amount of well ocher remains in the solution in the form of relatively small particles. These particles have been blown off the filter gravel particles during the test. The pH value has not changed during the reaction, or only insignificantly: pH$_{(end)}$ approximately 7.

Comparison to Conventional Processes:

A reaction solution containing 0.3 m HCl (pH$_{(beginning)}$ approximately 0.5) and 5% hydrogen peroxide, removes about 20% of the initially used filter gravel quantity at otherwise same test conditions (such as reaction time and reaction temperature). When considering the facts that the filter gravel particles consist of ocher envelope and gravel stone core and the gravel stone core does not dissolve under the selected solubilization conditions, the comparison of the de-ochering potential between both agents turns out even more clearly in favor of the dithionite solution according to the invention.

When operating with a solution of sodium dithionite of approximately 3% by weight and simultaneous use of approximately 20 mmol/l of phosphonobutane-1,2,4-tricarboxylic acid (PBTC) or citrate at a pH value of 6.4 ($H_2CO_3/HCO_3$—buffer), even better results are realized.

EXAMPLE 2

Used Substances or Agents

Used is a well filter gravel enveloped by a well ocher which forms a solid layer of mean width of approximately 1 mm about the gravel particles (present in a particle size fraction of 0.2 to 0.5 mm). The well ocher is composed chemically in this example primarily of Mn(IV) compounds that are difficult to dissolve. The ocher-enveloped gravel particles have been pre-dried at 60° C. for constant weight.

Removal of the well ocher from the gravel particles is carried out according to the process of the invention by using a freshly prepared 10% solution of solid sodium dithionite in water (100 g sodium dithionite per 1 kg solution).

Testing Method:

5.00 g of the dried gravel particles enveloped by well ocher are added in 5 ml freshly prepared 10% solution of sodium dithionite. The sample (pH value$_{(beginning)}$ approximately 7) is then left standing for 16 hours without mechanical influence (agitating, ultrasound or the like) at 20° C.

After 16 hours, the sample is slightly shaken for peeling off loosely adhering well ocher, and the remaining ocher sample (gravel particles with enveloping well ocher) is separated from the liquid phase (remaining solution of sodium dithionite).

The remaining, ocher-enveloped gravel particles are dried to constant weight and weighed again.

Result:

2.60 g ocher-enveloped gravel particles remain. This corresponds to a decrease of 48%, relating to the initially used filter gravel quantity. No significant amount of small particles remains in the solution. Ocher removed from the filter gravel has thus, in fact, been dissolved after the reduction of the Mn(IV) to Mn(II). The blow-off effect observed in particular in the Fe(III) containing filter gravel according to Example 1, could not be observed here. The pH value has not changed during the reaction, or only insignificantly: pH$_{(end)}$ approximately 7.

Also in this case, the added use of complexing agents, such as PBTC, results in further improvements.

EXAMPLE 3

Used Substances or Agents

Used is a well filter gravel enveloped by a well ocher which forms a solid layer of mean width of approximately 1 mm about the gravel particles (present in a particle size fraction of 0.2 to 0.5 mm). The well ocher is composed in this example primarily of Fe(III) compounds that are difficult to dissolve.

The ocher-enveloped gravel particles were used in moist condition.

Removal of the well ocher from the gravel particles is carried out by using a freshly prepared 3% solution of solid sodium dithionite in water which further contains 0.1 mol/L PBTC in the form of its tetra sodium salt (commercial name "Bayhibit S" by Bayer AG) and 0.1 mol/L of an equimolar sodium hydrogen carbonate/carbonic acid buffer.

Testing Method:

13.00 g of the well ocher are affixed in the interior of plastic ring of 40 mm inner diameter and a height of 10 mm by means of two plastic nets with a mesh size of approximately 0.2 mm. The ocher-filled ring is secured approximately 15 mm above the bottom of a beaker glass. The ocher is removed from the particles by adding 80 mL of the above-stated dithionite solution to the well ocher. The solution is stirred at room temperature for 24 hours at 550 revolutions/min. 0.1 mL of the solution are withdrawn in time-controlled manner, filtered through a 0.2 μm filter and its iron content is analyzed.

Result:

After treatment for 2 hours, the maximum solubility of iron is reached. Hereby 4200 mg/L of iron are present in the solution. Already after one hour, 4100 mg/L have been measured, thereby confirming the rapid effect of the solution. Subsequently, the iron content drops again slightly in the solution (3900 mg/L after 24 hours). This drop can be explained by a precipitation of Fe-salts which can be attributed to the exhaustion of the dithionite solution.

The presence of an effective dithionite concentration can be simply checked through discoloration of a methylene blue solution—if too little dithionite is in the solution, methylene blue will not be discolored. Thus, methylene blue is suitable to monitor the regeneration process, when periodically testing, e.g. during well regeneration, a partial amount, pumped out for test purposes from the well.

While the invention has been illustrated and described as embodied in a process for removing deposits from water-carrying systems and devices for water supply, it is not intended to be limited to the details shown since various modifications and structural changes may be made without departing in any way from the spirit of the present invention.

What is claimed as new and desired to be protected by Letters Patent is set forth in the appended claims:

1. A process for removing deposits precipitated from cold freshwater from water-carrying systems and devices for water supply, or from their individual parts, said process comprising the steps of dissolving the deposit to be removed from cold freshwater in water-carrying systems and devices for water supply by contacting the deposit with an aqueous treatment solution comprised of a combination of a reducing agent selected from the group consisting of dithionite, disulfite and mixtures thereof, and a complexing agent selected from phosphono butane-1,2,4-tricarboxylic acid and its alkali metal salts for a period sufficient to dissolve at least part of said deposit and removing spent treatment solution from the so treated water carrying system or the devices for water supply.

2. The process of claim 1, wherein the deposits are dissolved at pH values in the range of about 4.5 to 9.5.

3. The process of claim 2, wherein the deposits are dissolved at pH values an the range from about 6.0 to 8.0.

4. The process of claim 1, wherein the concentration of the treatment solution of dithionite, disulfite or their mixture is in the range from 0.5 to 25 percent by weight.

5. The process of claim 1, wherein the treatment solution further comprises at least a component selected from the group consisting of buffer salts, wetting agents and stabilizers, wherein the component is introduced in a state selected from the group consisting of dissolved state, emulsified state, and as suspended solids.

6. The process of claim 1, wherein the deposit is at least one compound selected from the group consisting of oxides, oxide hydrates, and hydroxides of iron metal or manganese.

7. The process of claim 1, wherein the contacting step in which the treatment solution is contacted with the deposit is carried out by at least one of spraying and washing off.

8. The process of claim 1, wherein the contacting step in which the treatment solution is contacted with the deposit is carried out by at least one of filling and rinsing the system or the device.

9. The process of claim 1, wherein the device for water supply includes at least one selected from the group consisting of water wells, drinking water reservoir, drinking water conduit, filter system, water preparation plant, plant sections and individual parts thereof.

10. The process of claim 1, wherein the device is a water well, said dissolving step including a) filling the well with the treatment solution, b) allowing the treatment solution to react with the deposit for a predetermined reaction time to dissolve the deposit in the treatment solution, a) subsequently emptying the well by pumping out its content together with the treatment solution with dissolved deposit, wherein an additional after-treatment step d) is carried out during which the treated well is subjected to an aqueous solution of an oxidant.

11. The process of claim 10, wherein steps a), b) end c) are repeated at least once, before carrying out step d).

12. The process of claim 10, wherein the oxidant is hydrogen peroxide.

13. The process of claim 2, wherein the water-carrying system includes one element selected from the group consisting of heat exchanger and cooling system and feed lines thereof, and the device for water supply includes one element selected from the group consisting of well, drinking water reservoir, drinking water conduit, filter system, water preparation plant, and plant sections and individual parts thereof.

* * * * *

UNITED STATES PATENT AND TRADEMARK OFFICE
CERTIFICATE OF CORRECTION

PATENT NO. : 6,827,090 B2  
DATED : December 7, 2004  
INVENTOR(S) : Michael Nürnberger et al.

It is certified that error appears in the above-identified patent and that said Letters Patent is hereby corrected as shown below:

Column 8,  
Line 34, replace "end" with -- and --;  
Line 38, replace "2" with -- 1 --.

Signed and Sealed this

First Day of March, 2005

JON W. DUDAS  
*Director of the United States Patent and Trademark Office*